Patented Nov. 9, 1948

2,453,214

UNITED STATES PATENT OFFICE 2,453,214

ETHYL CELLULOSE COMPOSITION

Hans G. Figdor, Philadelphia, Pa., assignor to E. F. Houghton & Co., Philadelphia, Pa., a corporation of Pennsylvania No Drawing. Application September 14, 1945, Serial No. 616,472

13 Claims. (Cl. 106—173)

This invention relates to plastic compositions, and, more particularly, it relates to thermoplastic compositions of the ethyl cellulose type.

Ethyl cellulose has been widely used for molding plastic products and for transparent films and coating compositions because it possesses a number of very valuable properties. For example, it is colorless, odorless, tasteless, and non-toxic; its flammability is appreciably lower than that of nitrocellulose; it is tough and flexible and does not become brittle at low temperature; it is compatible with a wide range of oils, waxes, natural and synthetic resins, and plasticizers; and it retains its valuable properties, for the most part, when blended with other materials.

In the past, it has been customary to blend ethyl cellulose with resins, for example, rosin, ester gum, cumarone-indene resins, alkyl resins, and/or waxes, for example, carnauba, candelilla, Montan, and beeswax, in order to make the ethyl cellulose plastic at lower temperatures and to decrease the viscosity of the molten product. It has been found that such mixtures of ethyl cellulose, resins, and/or waxes have some compatibility with materials which are incompatible with ethyl cellulose, such as paraffin wax, ozokerite, asphalt, and mineral oil. For example, compositions have been compounded which contain (by weight) 1 part of ethyl cellulose, 1 part of an oil-soluble, ethyl cellulose-compatible resin, and 2 parts of mineral oil. While such compositions are homogeneous and possess many of the valuable properties of ethyl cellulose, they exude excessive amounts of oil from the surfaces. The loss of oil increases at increased temperature and is dependent also on thickness of the layer of film, thinner layers exuding more oil than thicker layers. Furthermore, this type of ethyl cellulose blend has a tensile strength appreciably lower than that of straight ethyl cellulose and becomes soft and may even become tacky at comparatively low temperatures, and these disadvantageous characteristics are further drawbacks to the use of the product.

One object of the present invention is to provide ethyl cellulose plastic compositions for use in the production of coatings, films, and molding plastics, which compositions are characterized by the valuable properties of ethyl cellulose without possessing the disadvantages or drawbacks of straight ethyl cellulose or of the ethyl cellulose blends previously available.

Another object of the present invention is to provide blends of ethyl cellulose containing relatively large amounts of oils and which, in spite of this, do not lose excessive amounts of oils by exudation.

A further object of the invention is to provide blends of ethyl cellulose with resins and oils in which the percentage of ethyl cellulose is relatively low but which nevertheless possess valuable properties, such as good tensile strength and freedom from tackiness at the elevated temperatures likely to be encountered in the use of the product.

Other objects of the invention will be apparent from a consideration of this specification and the claims.

In the past, it has been customary to obtain a compatible mixture of ethyl cellulose, resins, plasticizers, and mineral oils by the use of resins and plasticizers which were both compatible with the ethyl cellulose and the mineral oil, the term "compatible" referring to the ability of two or more substances to mix with each other to form a substantially homogeneous composition. For example, rosin, ester gum, cumarone-indene polymers, chlorinated biphenyls, methyl abietate, pentaerythritol esters of rosin, polymerized and hydrogenated rosins and ester gums, rosin oils, dialkyl phthalates, and the like have been used with ethyl cellulose and mineral oil.

While some attempts have been made to incorporate into ethyl cellulose compositions a small percentage of plasticizers which are more compatible with ethyl cellulose than with mineral oils, for example, castor oil and castor oil modified alkyd resin, all the hard resins used in ethyl cellulose compositions containing a relatively high content of mineral oil have been compatible with, that is to say, soluble in the mineral oil. Such products, as stated, exhibit excessive oil exudation on prolonged storage and at elevated temperatures, and applicant has observed that the resin itself partly exudes with the oil.

The term "plasticizer" as used herein includes the various organic liquids and soft resins which function to increase the plastic flow of the composition, and these materials are to be contrasted with the "hard resins" which are hard and solid at room temperature and do not impart any significant plasticizing effect to the compositions at such temperature.

In contrast to the previous practice, the ethyl cellulose composition of the present invention contains a resin which is hard and solid at room temperature and which, while compatible with the ethyl cellulose, is relatively incompatible with the mineral oil, that is to say, it is only slightly soluble or is insoluble in the mineral oil, such products being referred to herein as relatively insoluble in the mineral oil. Furthermore, the hard resin is present in an amount less than the amount of ethyl cellulose. The composition also contains in addition to the ethyl cellulose and hard resin a relatively high content of mineral oil, by which is meant a content of mineral oil by weight at least equal to and preferably greater than the content of ethyl cellulose. It has been found that such a composition on prolonged standing or at elevated temperatures will not lose excessive amounts of oil by exudation and that no exudation of the resin will be encountered. The composition will be harder at elevated temperatures and will have an improved tensile strength as compared to a composition containing an oil-miscible resin.

Referring to the ethyl cellulose, the use of a grade which is soluble in organic solvents is preferred and the ethyl cellulose advantageously has an ethoxy content of about 43% to 50%, the preferred range being from 46.5% to 49.5%. The viscosity of the ethyl cellulose may vary widely, for example, from 7 to 300 centipoises in 5% solution, as determined by the standard procedure.

As stated, the hard resin employed is one which is compatible with the ethyl cellulose but relatively insoluble in the mineral oil. The resin may be any natural or synthetic resin which meets the requirements with respect to its comparative incompatibility with the mineral oil and compatibility with ethyl cellulose. Examples of such resins are the maleic acid-modified alkyd resins and the maleic acid-modified ester gums, such as the resins now available on the market and known as "Amberol 801," "Lewisol 33," and "Beckacite 1120"; the resins derived from furfural extracts of wood rosin residues, and the derivatives thereof formed by esterification with a polyhydric alcohol, for example, the "Vinsol" resin and "Vinsol" ester gum of the trade; and gum mastic.

Referring to the mineral oil, a wide range of such oils may be used in the product of the invention. The viscosity may vary widely, for instance, from 50 to 2,000 seconds at 100° F. (Saybolt), 150 to 600 seconds being the preferred viscosity. The oils may be crude, solvent-refined, or sulphuric acid-refined. In order to improve the initial compatibility of the composition, it is desirable to employ an oil whose aniline point is not too high, preferably below 90° C., aniline point being defined as the lowest temperature of complete miscibility of equal volumes of the oil and dry, freshly distilled aniline.

In certain preferred embodiments of the invention, a plasticizer is included in the composition, although for certain purposes, for example, where a rigid plastic product is desired, no plasticizer is required and the invention, therefore, pertains to both plasticized and unplasticized compositions. The plasticizer, when employed, is compatible with the ethyl cellulose and, in the preferred embodiment, is relatively incompatible with mineral oil, that is, is relatively insoluble in the mineral oil, or at least is more compatible with the ethyl cellulose than with the mineral oil.

Examples of plasticizers are castor oil, glycerol monoricinoleate, acetylated castor oil, butyl acetyl ricinoleate, ethyl ester of acetylated polymerized ricinoleic acid (Baker's P-16), castor oil or ricinoleic acid modified glycerol adipate or sebacate resins, and methyl, phthalyl, ethyl glycollate ("Santicizer M-17"), all of which plasticizers are of high compatibility with the ethyl cellulose.

In addition, the ethyl cellulose plastic composition may contain fillers, for example, wood flour; pigments, for instance, ocher, mineral, vegetable or animal waxes; animal or vegetable oils, synthetic resins which are compatible with the mineral oil; and/or stabilizers, such as an antioxidant. The use of a stabilizer is especially advantageous in the case of protective coatings applied by hot dipping in the molten plastic, in other words, when the plastic is to be kept at a high temperature for a considerable period of time.

Referring to the proportions of the three essential ingredients of the composition, namely, the ethyl cellulose, the mineral oil, and the hard resin compatible with the ethyl cellulose but relatively insoluble in the mineral oil, it has been pointed out that the mineral oil by weight is at least equal and is preferably greater than the ethyl cellulose and that the amount of hard resin is less than the amount of ethyl cellulose. In the preferred embodiment, only 1 part of hard resin is used from each 2 to 5 parts of ethyl cellulose since a higher percentage of hard resin will impair the elastic properties of the final composition. While this defect can be compensated for by increasing at the same time the content of plasticizer, such procedure is not economical.

Since mineral oil is the cheapest ingredient of the composition, its percentage will be kept, for economical reasons, as high as feasible for the particular compositions prepared. In some compositions, for example, a corrosion-proof metal coating of the strippable coating type, a small amount of oil exudation is desirable and, accordingly, a comparatively high percentage of mineral oil is advantageously incorporated into the plastic. In such a product, the mineral oil may amount to three times or more the amount of the ethyl cellulose plus the hard resin. In other cases, for example molded plastics, the allowable amount of oil will be appreciably smaller, for example, an amount equal to or only slightly in excess of the ethyl cellulose. In any case, however, the product of the invention will contain an appreciably higher percentage of mineral oil than has been employed in prior art products and products which contain only a minor amount of mineral oil do not possess the properties of the products of the invention.

Generally, the relative proportions of the ethyl cellulose, the hard mineral oil incompatible resin, and the mineral oil are as follows: ethyl cellulose 15% to 45%, preferably 20% to 40%; hard resin 2% to 20%, preferably 3% to 15%; and mineral oil 25% to 75%, preferably 35% to 70%, in any case, the mineral oil being present in an amount at least equal to the ethyl cellulose and the hard resin being present in an amount less than the ethyl cellulose. When a plasticizer is employed, it is usually present in an amount between about 1% to 20%, preferably 7% to 15% based on the total weight of the three aforesaid ingredients. When a hard resin which is soluble in the mineral oil is employed, for example the resins of those characteristics hereinabove referred, it will usually be present in an amount between about 2% and 20% based on the total weight of the ethyl cellulose, the hard resin incompatible with the mineral oil, and the mineral oil. Generally, the combined weight of the hard resins will not exceed the weight of ethyl cellulose. The fillers, pigments, and other materials, when employed, will be present in an amount to impart the desired properties. The stabilizer, if used, need be present only in small amounts, for example 0.1% to 2% based on the weight of the three primary ingredients of the composition.

In order to illustrate the invention further, the following examples are given, the parts being by weight:

Example I

| | Parts |
|---|---|
| Ethyl cellulose, 10 centipoises | 40 |
| Glycerol ester of maleic anhydride modified rosin | 15 |
| Castor oil No. 1 | 5 |
| Mineral oil, 500 viscosity (Saybolt) | 40 |

The mineral oil is heated to about 150° C.–175° C., then the castor oil, the modified rosin, and the ethyl cellulose are added and the temperature is raised to 200° C. and kept at this temperature until the mixture has become homogeneous and all air bubbles have escaped. Then a film is cast, by means of any suitable film casting device, from the molten mass. The mixture will set immediately on cooling.

Example II

| | Parts |
|---|---|
| Ethyl cellulose, 50 centipoises | 40 |
| Glycerol ester of maleic anhydride modified rosin | 10 |
| Castor oil | 5 |
| Mineral oil, 500 sec. (Saybolt) at 100° F. | 40 |
| Yellow pigment | 5 |

The pigment is milled with a sufficient amount of mineral oil, by means of a three-roller mill, to yield a smooth paste. The balance of the oil is heated to 170° C., then the castor oil, ethyl cellulose, and modified rosin are added and heated to 200° C. with stirring. When the ethyl cellulose has melted completely, the mixture will form a viscous, homogeneous melt. After the entrained air has escaped, the pigment slurry is stirred in. The molten mix is poured into molds of the desired shape and allowed to cool.

Example III

| | Parts |
|---|---|
| Ethyl cellulose, 50 centipoises | 12 |
| Vinsol ester gum (Hercules Powder Co.) | 3.5 |
| Castor oil modified glycerol sebacate resin | 2 |
| Castor oil | 1.5 |
| Paraffin, melting point 56° C. | 1 |
| Mineral oil, 350 se. (Saybolt) at 100° F. | 30 |
| Xylol | 40 |
| Butyl alcohol | 10 |

The Vinsol ester gum is refluxed with the mixture of the solvents; after solution, the ethyl cellulose is stirred in, at room temperature, and agitation continued until all is dissolved; then the castor oil, the soft resin, the mineral oil, and the previously melted paraffin are added.

The solution is used for cold dipping metal articles which are to be protected against rust and corrosion. The article may be from iron, copper, aluminum, zinc, etc., and may have any desired shape. The dipping temperature should not be appreciably higher than room temperature on account of the flammability of the solvents. The metal articles are allowed to dry in a current of air. After complete evaporation of the solvents, the metal is coated with a protective film which is non-tacky also at elevated temperatures.

Example IV

| | Parts |
|---|---|
| Ethyl cellulose, 20 centipoises | 10 |
| Vinsol ester gum | 2.8 |
| Castor oil modified alkyd resin | 2.2 |
| Paraffin, melting point 56° C. | 1 |
| Mineral oil, 200 second (Saybolt) | 24 |
| Amyl alcohol | 5 |
| Ethyl alcohol | 10 |
| Toluol | 20 |
| Solvesso No. 2 | 25 |

The solution is made as in Example III, or the plastic composition may be first prepared as in Example I and then dissolved in the mixture of the four solvents.

The solution is used for coating metal parts by spraying from a spray gun, to protect the metals from corrosion. If desired, the solids content of the spraying solution may be cut down by using an additional amount of the mixture of the four solvents. The protective film will be non-tacky at elevated temperatures.

Example V

| | Parts |
|---|---|
| Ethyl cellulose, 100 centipoises | 21 |
| Maleic anhydride modified ester gum | 7 |
| Paraffin wax | 2 |
| Non-drying alkyd resin | 3 |
| Castor oil | 2 |
| Mineral oil, 500 sec. (Saybolt) | 64.5 |
| p-Benzyl amino phenol | 0.5 |

The mineral oil, stabilizer, castor oil, wax, and the two resins are heated to 150° C., then the ethyl cellulose is stirred in and the temperature is gradually raised to 190° C.–210° C. After the mixture has become homogeneous, metal parts are dipped in the hot melt at 175° C. to 200° C. and immediately removed. This will coat the metals with a protective film to prevent corrosion. This film will stand temperatures of 70° C. without becoming tacky; it will not be impaired by high humidity or by contact with salt solution. The film can be easily removed at any time when protection is no longer necessary. It can be peeled like a banana since the tensile and elastic properties of the coating are satisfactory. The film will show slight exudation; such separation of oil, however, in limited amounts, is very desirable since it increases the corrosion protective properties and facilitates peeling off.

If regular ester gum or a cumarone-indene resin (which resins are compatible with the mineral oil) is substituted for the modified ester gum, the film will have a much lower tensile strength and exude an excessive amount of oil. In this way, the superiority of this invention over the previous art can easily be shown.

Example VI

| | Parts |
|---|---|
| Ethyl cellulose, 50 centipoises, 47.5% ethoxy | 21 |
| Maleic anhydride—modified ester gum | 7 |
| Hard coumarone-indene resin | 7 |
| Paraffin wax | 3 |
| Castor oil | 6 |
| Mineral oil, 300 sec. (Saybolt) | 56 |

The mineral oil and resins are melted together with the wax and castor oil and the temperature raised to 150° C. and the ethyl cellulose gradually added. The temperature is then brought to 190° C. and held till the mixture is homogeneous. The material is poured into suitable molds and allowed to cool. The molded material is a plastic mass which may either be dissolved in suitable solvents and applied by spraying or cold dipping or may be melted and applied by hot dipping at 180° C. or above. In this example a mixture of hard resins, one of which is soluble and the other relatively insoluble in mineral oil, is used. The oil-soluble resin serves as a blending agent.

Considerable modification is possible in the composition of the plastic products of the invention, as well as in the methods of preparing them and in the use thereof, without departing from the essential features of the invention.

I claim:

1. A thermoplastic composition comprising ethyl cellulose, mineral oil, and a resin hard and solid at room temperature and compatible with the ethyl cellulose but relatively insoluble in the mineral oil, the relative amounts by weight of the three said ingredients based on the total weight thereof being as follows: ethyl cellulose between about 15% and about 45%, mineral oil in an amount at least equal to the ethyl cellulose but not greater than about 75%, and the hard resin in an amount less than the ethyl cellulose but not less than about 2%.

2. A thermoplastic composition comprising ethyl cellulose, mineral oil, a resin hard and solid at room temperature and compatible with the ethyl cellulose but relatively insoluble in the mineral oil and a plasticizer of high compatibility with the ethyl cellulose but relatively incompatible with the mineral oil, the relative amounts by weight of the said ethyl cellulose, mineral oil and hard resin based on the total weight thereof being as follows: ethyl cellulose between about 15% and about 45%, mineral oil in an amount at least equal to the ethyl cellulose but not greater than about 75%, and the hard resin in an amount less than the ethyl cellulose but not less than about 2%.

3. A thermoplastic composition comprising ethyl cellulose, mineral oil, a resin hard and solid at room temperature and compatible with the ethyl cellulose but relatively insoluble in the mineral oil, a resin hard and solid at room temperature and compatible with both the ethyl cellulose and the mineral oil and a plasticizer of high compatibility with the ethyl cellulose but relatively incompatible with the mineral oil, the relative amounts by weight of the said ethyl cellulose, mineral oil and hard resins based on the total weight thereof being as follows: ethyl cellulose between about 15% and about 45%, mineral oil in an amount at least equal to the ethyl cellulose but not greater than about 75%, and the hard resins being present in an amount less than the ethyl cellulose but not less than about 2%.

4. A thermoplastic composition comprising ethyl cellulose, mineral oil and a resin hard and solid at room temperature and compatible with the ethyl cellulose but relatively insoluble in the mineral oil, the said three ingredients being present in the following relative proportions based on the total amount thereof present in the composition: ethyl cellulose 15% to 45%, mineral oil at least equal in weight to said ethyl cellulose within the range of 35% to 75%, resin in an amount less than said ethyl cellulose within the range of 2% to 20%.

5. The thermoplastic composition of claim 4 wherein the ethyl cellulose, the mineral oil, and the resin are present in the following relative proportions based on the total amount thereof present in the composition: ethyl cellulose 20% to 40%, mineral oil at least equal in weight to said ethyl cellulose within the range of 35% to 70%, resin 3% to 15%.

6. The thermoplastic composition of claim 4 wherein the said resin is a synthetic resin of the alkyd type modified with maleic anhydride.

7. The thermoplastic composition of claim 4 wherein the said resin is a maleic anhydride modified ester gum.

8. The thermoplastic composition of claim 4 wherein the said resin is the furfural-soluble residue of wood rosin distillation esterified with a polyhydric alcohol.

9. A thermoplastic composition comprising ethyl cellulose, mineral oil, a resin hard and solid at room temperature and compatible with the ethyl cellulose but relatively insoluble in the mineral oil, and a plasticizer of high compatibility with the ethyl cellulose but relatively incompatible with the mineral oil, the ethyl cellulose, the mineral oil, and the said resin being present in the following relative proportions based on the total amount thereof: ethyl cellulose 15% to 45%, mineral oil at least equal in weight to said ethyl cellulose within the range of 35% to 75%, resin in an amount less than said ethyl cellulose within the range of 2% to 20%, and the plasticizer being present in an amount between about 1% and 20% based on the total weight of the ethyl cellulose, the mineral oil, and the said resin.

10. The thermoplastic composition of claim 9 wherein the ethyl cellulose, the mineral oil, and the resin are present in the following relative proportions based on the total weight thereof present in the composition: ethyl cellulose 20% to 40%, mineral oil at least equal in weight to said ethyl cellulose within the range of 35% to 70%, resin 3% to 15%, and wherein the plasticizer is present in an amount between 3% and 15% based on the total weight of the ethyl cellulose, the mineral oil, and the said resin.

11. The thermoplastic composition of claim 9 wherein the said resin is a synthetic resin of the alkyd type modified with maleic anhydride.

12. The thermoplastic composition of claim 9 wherein the said resin is a maleic anhydride modified ester gum.

13. The thermoplastic composition of claim 9 wherein the said resin is the furfural-soluble residue of wood rosin distillation esterified with a polyhydric alcohol.

HANS G. FIGDOR.

REFERENCES CITED

The following references are of record in the file of this patent:

UNITED STATES PATENTS

| Number | Name | Date |
|---|---|---|
| 2,082,592 | Nollau | June 1, 1937 |
| 2,271,724 | Traylor | Feb. 3, 1942 |
| 2,297,709 | Kauppi | Oct. 6, 1942 |
| 2,311,609 | Kauppi | Feb. 16, 1943 |
| 2,313,186 | Wiggam | Mar. 9, 1943 |
| 2,362,166 | Speicher | Nov. 7, 1944 |